United States Patent [19]
Thompson

[11] 3,942,614
[45] Mar. 9, 1976

[54] GEAR SELECTOR SAFETY LOCK
[76] Inventor: Owen L. Thompson, 303 Ellsworth, Saginaw, Mich. 48604
[22] Filed: June 24, 1974
[21] Appl. No.: 482,075

[52] U.S. Cl.............. 192/4 A; 74/483 R; 74/483 K; 74/539
[51] Int. Cl.²...................... G05G 5/10; F16D 67/00
[58] Field of Search... 192/4 A, 3 R; 74/878, 483 R, 74/483 K, 529, 539; 180/82 A

[56] References Cited
UNITED STATES PATENTS

| | | | |
|---|---|---|---|
| 2,740,947 | 4/1956 | Davies | 180/82 A X |
| 2,875,640 | 3/1959 | Huso | 74/483 K X |
| 2,890,581 | 6/1959 | Lewis | 192/4 A X |
| 3,598,209 | 8/1971 | Pearce | 192/4 A |

*Primary Examiner*—Allan D. Herrmann
*Attorney, Agent, or Firm*—John J. Swartz

[57] ABSTRACT

A gear shift safety lock for selectively preventing and permitting movement of a motor vehicle gear shift selector mechanism between a non-drive position and a drive position, including a solenoid actuated plunger that is movable between a position in the path of the gear shift selector mechanism and a removed position out of the path when a motor vehicle brake pedal is actuated.

9 Claims, 5 Drawing Figures

GEAR SELECTOR SAFETY LOCK

BACKGROUND OF THE INVENTION

This invention relates to a safety device for preventing the accidental movement of a motor vehicle gear shift level to a drive position until a predetermined condition is satisfied and more particularly, to a gear shift lock, mechanism which selectively inhibits movement of the gear shift selector to a drive position by a small child.

A motor vehicle operator who departs his motor vehicle for only a very short time frequently leaves the motor vehicle engine operating. The motor vehicle operator will generally place the motor vehicle transmission gear selector lever in a "park" or "neutral" position, which normally prevents forward or rearward movement of the vehicle, even though the engine remains operating. Each year, many accidents occur when small children, remaining unattended in the vehicle, move the transmission gear selector lever to a drive position.

It is a natural tendency of a child to imitate an adult driver, and children left unattended in an automobile will frequently imitate the adults by addressing the steering wheel and manipulating the transmission gear selector lever. If the vehicle engine is operating and the gear selector is placed in a drive position, the vehicle will lurch forwardly. This frequently results in extensive property damage and bodily injury, to pedestrians, bystanders and the occupants of the vehicle.

It is an object of the present invention to provide a gear shift lock mechanism which will prevent the accidental or inadvertent movement of an automobile gear shift lever to a drive position.

It is another object of the present invention to provide safety apparatus which will positively preclude a small child from moving an automobile gear selector to a drive position.

It is a further object of the present invention to provide a gear shift lock device of the type described, which cannot be moved to a lock position until the brake pedal is actuated in a direction toward a braking position.

It is yet another object of the present invention to provide a gear shift lock device which includes a control element located remotely from the lock device that must be actuated to operate the control element and permit the movement of the gear shift lever to a drive position, but which is normally inaccessible to a small child.

A further object of the present invention is to provide a control system of the type described including an electrically energizable solenoid which moves a plunger between a position in the path of a gear shift lever and a removed position in response to actuation of a control element by a brake pedal.

It is another object of the present invention to provide apparatus which will enable a vehicle operator to safely leave a motor vehicle unattended and yet prevent a small child from moving the gear shift lever to a drive position.

Other objects and advantages of the present invention will become apparent to those of ordinary skill in the art as the description thereof proceeds.

SUMMARY OF THE INVENTION

Apparatus for selectively preventing and permitting movement of a motor vehicle gear shift selector mechanism to a drive position including mechanism movable between a position in the path of the gear shift mechanism and a removed position out of the path.

Figure 1:
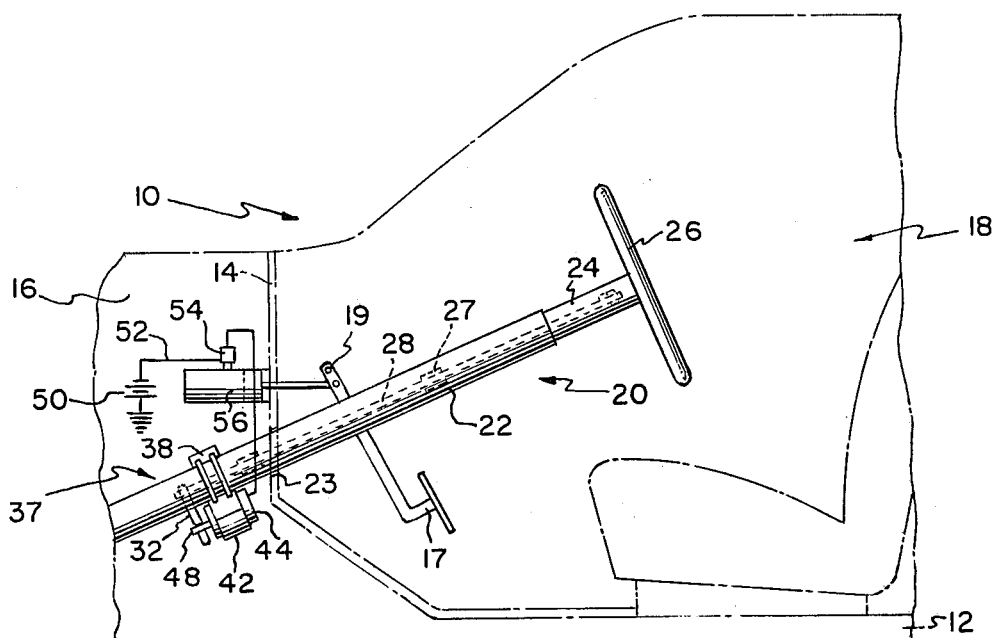
FIG. 1 is a fragmentary, schematic, sectional side view of a motor vehicle incorporating apparatus constructed according to the present invention.

Apparatus constructed according to the present invention is particularly adapted for use with a motor vehicle generally designated 10, including a frame generally designated 12, having a fire wall 14, separating an engine compartment 16 from a passenger compartment 18. The motor vehicle 10 also includes brake mechanism, not shown, as usual controlled by foot actuated brake pedal 17 swingable about a pivot 19 as usual.

The motor vehicle 10 includes a steering column assembly generally designated 20, having a stationary, tubular steering sleeve 22, journaling a steering post 24, which is rotatable in a to and fro path about its axis by a steering wheel 26 fixed to one end of the steering post 24. The opposite end of the steering post 24 is coupled to motor vehicle steering tie-rods (not shown) which function to turn the vehicle wheels in the normal manner when the vehicle operator turns the steering wheel 26. The steering column assembly 20 passes through a suitable opening 23 provided in the fire wall 14.

Mounted on the steering sleeve 22, via brackets 27, is an elongate shift bar 28 which is rotated about its axis via a manually graspable shift lever 30 fixed to the upper end thereof. The lower end of the shift bar 28 mounts a lever arm 32 which is connected to a linkage 34 that is coupled to the vehicle transmission, generally designated 36. By rotating the rod 28 about its axis, the operator can select the transmission gear in which the vehicle is to operate in a well known manner.

The gear shift bar 28 is utilized in either manually operated transmissions or so-called automatic transmissions. As is well known of an automatic transmission, the transmission gear shift lever 30 is movable between park, neutral, drive, and reverse positions. The gear shift selector lever 30 is relatively easy to move and can be moved by a small child from a non-drive or neutral position to a "drive" or "reverse" position. If the parking brake is not set, and the selector lever is moved into drive or reverse positions, the vehicle will move in a forward or reverse direction depending on the gear selected. Since the child is generally unable to thereafter control the vehicle, an accident will generally result.

Apparatus constructed according to the present invention is generally designated 37 and includes a mounting bracket 38 coupled to the lower end of the steering sleeve 22 via U-bolts 40. The outer end of the bracket 38 includes a semi-cylindrical recessed portion 42 which receives a solenoid housing 44 that is fixed thereto by welding or any other suitable manner. The solenoid housing 44 mounts an electrically energizable solenoid winding 46 which controls movement of a magnetic plunger 48. A spring (not shown) normally urges the plunger to an extended position in the path of the lever arm 32. When the solenoid winding 46 is energized, it functions to withdraw the plunger 48 into the solenoid housing 44 out of the path of the lever arm 32.

The solenoid winding is connected in series circuit with the vehicle battery 50 via a circuit line 52 and a pressure switch 54. The pressure switch 54 is mounted on a master brake cylinder and includes an actuator which is moved or tripped when the brake pedal 17 is depressed and pressure builds in brake cylinder 56. When the brake pedal 17 is depressed, the actuator 56 is tripped to close the switch 54 and connect the battery 50 to the solenoid 46. The switch 54 is normally spring biased to the open position and is not closed until the brake pedal 17 is depressed and the brake line pressure builds.

THE OPERATION

Figure 3:
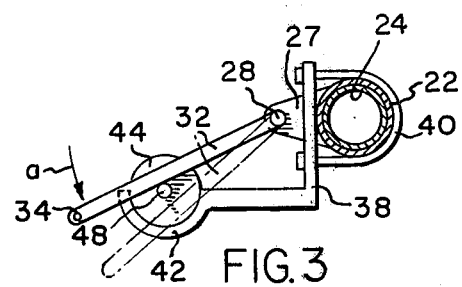
FIG. 3 is sectional end view taken along the line 3—3 of FIG. 2.

It will be assumed that the gear shift lever 30 is in the "park" position. When the vehicle operator depresses the brake pedal 17 to actuate the plunger 56 and close switch 54, the solenoid 46 is energized to withdraw the plunger 48 out of the path of the lever arm 32. This permits the rod 28 to be rotated about its axis so that the gear shift selector lever 30 can be moved from the park position to the drive or reverse positions. As the rod 28 is rotated counter-clockwisely about its axis in the direction of the arrow *a* (FIG. 3), the lever arm 32 is also swung downwardly in the direction of the arrow *a* to the position illustrated in chain lines in FIG. 3. This forces the coupling linkage 34 to a position in which the appropriate transmission gear is selected.

Figure 2:
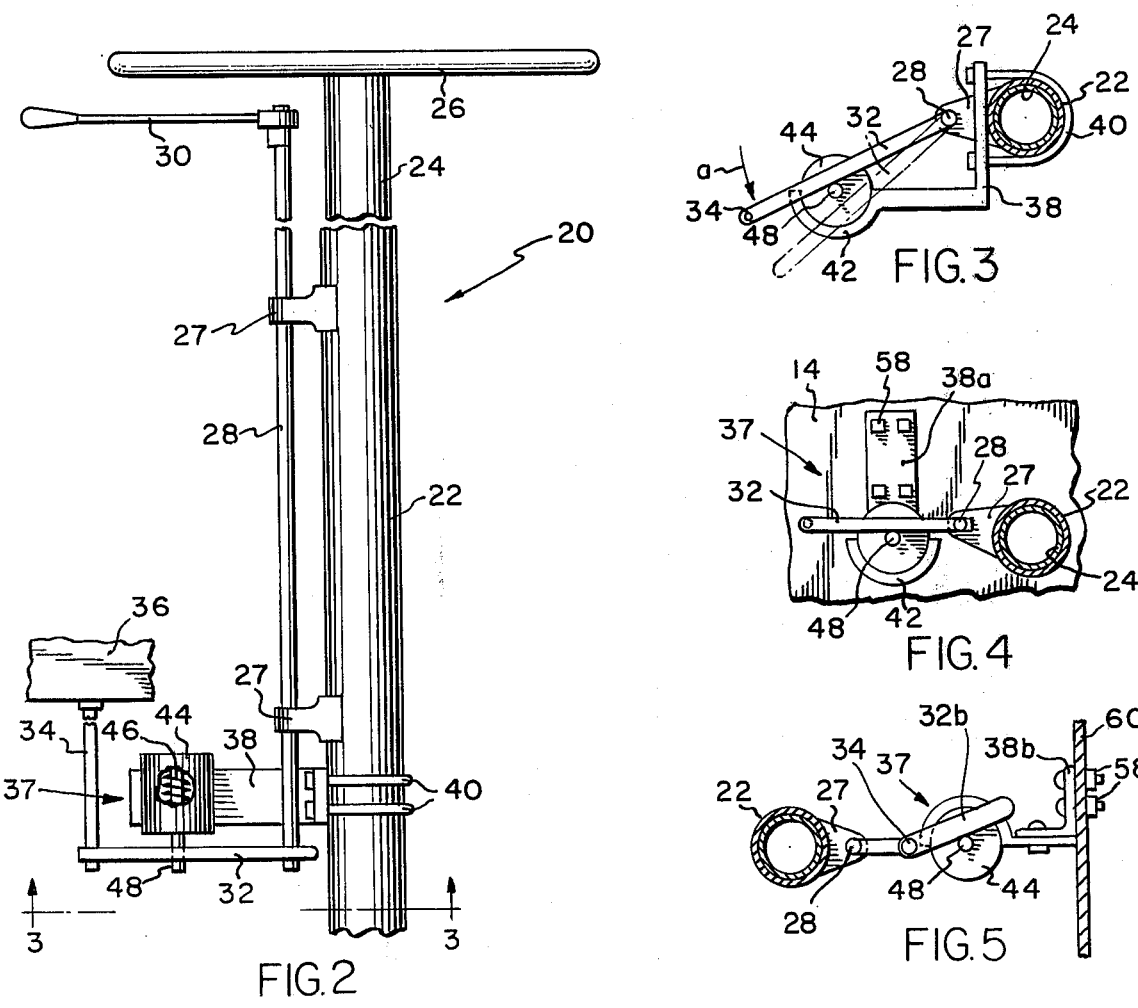
FIG. 2 is an enlarged, top plan view of the apparatus constructed according to the present invention.

As soon as the vehicle operator releases the brake pedal 17, the switch 54 is again opened and the plunger 48 returns to the extended position illustrated in FIG. 2. In the extended position, the plunger 48 will preclude the operator from inadvertently moving the gear shift lever 30 to a park or neutral position unless the brake pedal 17 is again actuated. If the vehicle transmission gear is moved into park position while the vehicle is operating at a high speed, the transmission will be damaged. By requiring that the operator to first depress the brake pedal 17 prior to moving the gear shift selector 30 to the park position, the vehicle transmission is protected from damage.

When the vehicle is to remain unattended for a short period of time, and the vehicle engine is to remain operating, the operator need merely again press the brake pedal 17 to retract the plunger 48 so that the gear shift lever 30 may be moved to the park position. Upon release of the brake pedal 17, the brake switch 54 again opens to deenergize the winding 46 and permit the plunger 48 to be spring returned to the position in the path of the lever 32. This prevents swinging movement of the gear shift lever 30 to a drive position. If a small child remains in the automobile while the vehicle is unattended, he will be unable to move the gear shift lever to a drive position because of the plunger 48. Since the switch 54 is remotely located from the gear shift lever 30, a small child is inhibited, if not totally prevented, from concurrently depressing the pedal 17 and moving the gear shift selector lever 30.

ALTERNATE EMBODIMENTS

Figure 4:
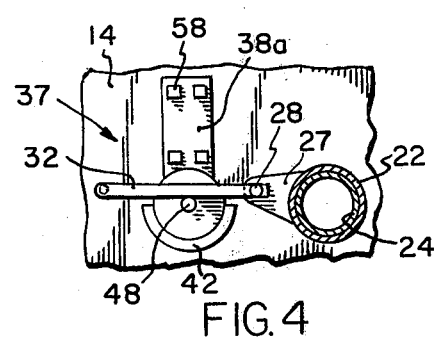
FIG. 4 is a sectional end view of a slightly modified construction illustrating the device mounted on an automobile engine compartment fire wall.
Figure 5:
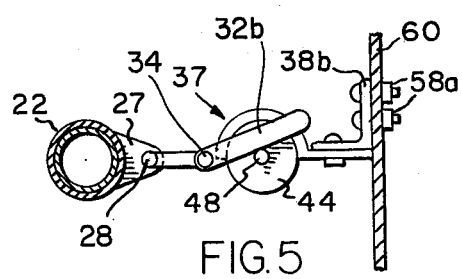
FIG. 5 is a slightly modified construction illustrating the device mounted on a motor vehicle fender wall.

Referring now more particularly to FIG. 4, an alternate embodiment is illustrated. The bracket 38 has been replaced by a bracket 38*a* which is mounted on the vehicle fire wall 14 via brackets 58. The embodiment illustrated in FIG. 5 is a mirror image of the embodiments illustrated by FIGS. 1–4. The bracket 38 is replaced by a bracket 38*b* which is mounted on the fender wall 60 via bolts 58*a*. Also the lever arm 32 is in the form of a bell crank 32*b*.

It should be understood that the gear shift selector lever is in a drive condition when it is in either the drive or reverse positions.

It is to be understood that the drawings and descriptive matter are in all cases to be interpreted as merely illustrative of the priciples of the invention, rather than as limiting the same in any way, since it is comtemplated that various changes may be made in various elements to achieve like results without departing from the spirit of the invention or the scope of the appended claims.

What is claimed is:

1. In combination:
   vehicle steering means including a steering column for steering a vehicle;
   transmission gear selector means mounted on said steering column means for movement between a non-drive position and steering column means for movement between a non-drive position and a drive position;
   fluid pressure operated brake means movable between a non-braking position and a braking position for selectively braking movement of said vehicle; and
   means responsive to said brake means being in said non-braking position for preventing movement of said gear selector means from said non-drive position to said drive position and responsive to a predetermined fluid pressure at which said brake means is operated as said brake means is moved in a direction from said non-braking position toward said braking position for permitting movement of said selector means.

2. The combination set forth in claim 1 wherein said fluid pressure operated brake means includes a brake and conduit means for communicating fluid to said brake means to move said brake means between said braking position and said non-braking position; and fluid pressure sensing means in fluid communicating relation with said conduit means for sensing a predetermined pressure of the fluid in said conduit means; said means responsive to said predetermined pressure including stop means movable between a removed position out of the path of said selector means and a position in said path, and means responsive to said sensing means for sensing a predetermined pressure in said conduit means for moving said stop means to said position in said path.

3. The combination as set forth in claim 1 wherein said brake means includes manually depressible brake pedal means movable between a normally non-depressed position and a depressed position for operating said braking means, and control means disposed in the path of said brake pedal means for conditioning said preventing means so that it will prevent movement of said selector means when said pedal means is in said non-depressed position and will permit movement of said selector means when said pedal means is in said depressed position.

4. The combination as set forth in claim 3 wherein said preventing means includes plunger means movable between a position in the path of said selector means to a position out of said path.

5. The combination as set forth in claim 1 wherein said transmission gear selector means comprises a longitudinally extending gear selector rod rotatable on said steering column in a to-and-fro path about its longitudinal axis, gear shift lever means connected to one end of said selector rod for rotating said rod about said axis and coupling means connected to the other end of said selector rod for movement therewith to couple said rod to a vehicle transmission; said preventing means including plunger means movable between a removed position out of the path of one of said gear shift lever means and said coupling means and a position in the path of said one of said gear shift lever means and said coupling means.

6. The combination as set forth in claim 5 wherein said preventing means comprises a housing, electrically energizable winding means in said housing for moving said plunger means, and means mounting said housing on said steering column means, said brake pedal means being disposed remotely from said gear selector means.

7. The apparatus as set forth in claim 1 including firewall means having an opening therein receiving said steering column means; said steering column means including a selector rod rotatable about the longitudinal axis thereof in a to-and-fro path of travel, a manually graspable gear shift arm at one end of rod and on one side of said wall for rotating said selector rod in said to-and-fro path of travel and a gear shift lever at the other end of said rod and on the opposite side of said wall adapted to be coupled to vehicle transmission means; said preventing means being disposed on said opposite side of said firewall means and including plunger means movable between a removed position out of the path of said gear shift lever and a position in said path.

8. Apparatus for selectively preventing movement of a motor vehicle transmission gear selector from non-drive position to a drive position as fluid pressure operated motor vehicle brake means moves between a non-braking position and a braking position for braking said vehicle comprising:
   plunger stop means movable between an extended position and a retracted position;
   electrically energizable means, adapted to be connected in circuit with a power source, for moving said plunger means between said extended and said retracted positions depending on whether the energizable means is energized;
   means for mounting said plunger means such that said plunger means in said extended position, is in the path of a portion of said gear selector and in said retracted position, is out of said path; and
   means responsive to a predetermined pressure at which said brake means is operated as said brake means is moved in a direction from said non-braking position to said braking position for selectively energizing said energizable means to move said plunger means to said extended position.

9. The apparatus as set forth in claim 8 including switch means operable in current conducting and non-conducting positions for selectively energizing said electrically energizable means.

* * * * *